US009445047B1

United States Patent
Frueh et al.

(10) Patent No.: US 9,445,047 B1
(45) Date of Patent: Sep. 13, 2016

(54) METHOD AND APPARATUS TO DETERMINE FOCUS OF ATTENTION FROM VIDEO

(71) Applicant: Google Inc., Mountain View, CA (US)

(72) Inventors: Christian Frueh, Mountain View, CA (US); Krishna Bharat, Palo Alto, CA (US); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 9 days.

(21) Appl. No.: 14/220,721

(22) Filed: Mar. 20, 2014

(51) Int. Cl.
*H04N 7/14* (2006.01)
*H04N 7/15* (2006.01)

(52) U.S. Cl.
CPC ....................................... *H04N 7/15* (2013.01)

(58) Field of Classification Search
None
See application file for complete search history.

(56) References Cited

U.S. PATENT DOCUMENTS

| 5,897,627 A * | 4/1999 | Leivian | G06K 9/6253 706/12 |
| 7,809,160 B2 * | 10/2010 | Vertegaal | A61B 3/113 345/157 |
| 2010/0125799 A1 * | 5/2010 | Roberts | G06F 3/011 715/757 |
| 2012/0293606 A1 * | 11/2012 | Watson | H04N 5/232 348/14.16 |
| 2014/0118537 A1 * | 5/2014 | Weatherhead | H04H 60/45 348/135 |

OTHER PUBLICATIONS

"Glass Broadcast Platform", CrowdOptic.com, 2 Pages www.crowdoptic.com, last accessed Feb. 26, 2014.
"Products.php", CrowdOptic.com, 2014, 2 Pages www.crowdoptic.com, last accessed Feb. 26, 2014.

* cited by examiner

*Primary Examiner* — Maria El-Zoobi
(74) *Attorney, Agent, or Firm* — Lowenstein Sandler LLP

(57) ABSTRACT

A method and system include identifying, by a processing device, at least one media clip captured by at least one camera for an event, detecting at least one human object in the at least one media clip, and calculating, by the processing device, a region in the at least one media clip containing a focus of attention of the detected human object.

17 Claims, 7 Drawing Sheets

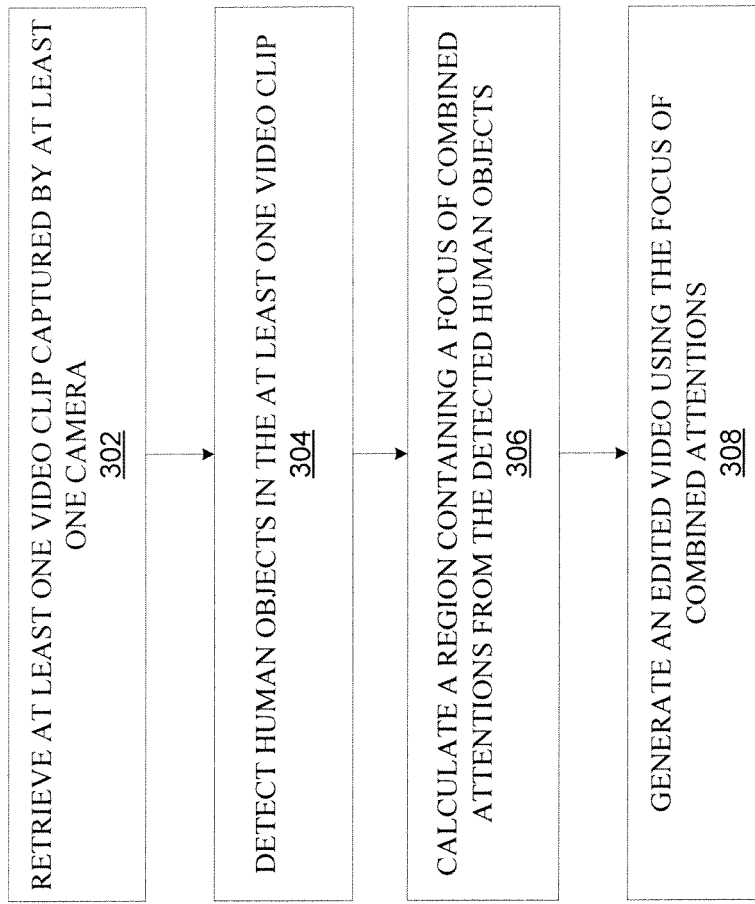

METHOD AND APPARATUS TO DETERMINE FOCUS OF ATTENTION FROM VIDEO

TECHNICAL FIELD

This disclosure relates to the field of media content sharing and, in particular, to detect a region of interest using attention focus detected from multiple streams of video or a set of images.

BACKGROUND

Multiple cameras may be deployed at an event to simultaneously capture video streams or images from different angles and transmit the captured video streams or images to an editing device. For convenience, video streams and images are collectedly referred to as media clips. Human operators may act as the editor to decide which stream of video contains the region of interest (e.g., the most salient object or person) and select the best video feed among the multiple video streams for any given moment. Lower-cost systems (such as video conference systems) can try to accomplish video editing automatically without the human editor. Currently, some of the automated systems try to determine the best video feed based on sound volumes. For example, the automated systems may select the video stream that has the highest sound volume as the one that captures the region of interest. However, the sound volume may not be a good indicator when sound signals are amplified by sound amplification systems, and it does not provide any information as to which particular region of a video stream is the region of interest. Other systems use the amount of motion in video streams as an indicator of region of interest. However, the amount of motion may not be reliable for certain situations. For example, the speaker at a meeting may not move much, but is nevertheless the center of attention for other individuals present at the meeting.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a method including identifying, by a processing device, at least one media clip captured by at least one camera for an event, detecting at least one human object in the at least one media clip, and calculating, by the processing device, a region in the at least one media clip containing a focus of attention of the detected human object.

Implementations of the disclosure may include a system including a memory and a processing device communicatively coupled to the processing device to retrieve at least one media clip captured by at least one camera for an event, detect at least one human object in the at least one media clip, calculate a region in the at least one media clip containing a focus of attention of the detected human object.

BRIEF DESCRIPTION OF THE DRAWINGS

The present disclosure is illustrated by way of example, and not by way of limitation, in the figures of the accompanying drawings.

FIG. 3 illustrates a flow diagram of a method to perform determination of attention focus according to implementations of the disclosure.

DETAILED DESCRIPTION

Indicators such as sound volumes and amount of motions are not reliable indicators of the best feed among multiple video streams with respect to a region of interest at an event (e.g., a meeting, a conference, a stage performance, a sports game, etc.). Further, even if these indicators may have detected the correct video stream, they only characterize that the stream is the interesting video stream, but do not determine which region in the video frames is the region of interest.

Aspects of the present disclosure address the above deficiencies by providing a mechanism that can reliably detect the best feed from multiple media clips and the region of interest within the best feed. In particular, this mechanism can detect human objects and based on attributes of the detected human objects, it can detect a focus of attention of these human objects. The focus of attention is then used to determine a media clip, and optionally which sub-region of that clip, that can best reflect the focus of attention of the human objects. For convenience, implementations of the disclosure are discussed with respect to video streams. However, it is understood that the implementations without limitation are equally applicable to media clips that may include one or more images.

For example, at a video conference, multiple cameras can be used to record the conference from different locations and angles. In this scenario, the gazes of the conference attendees may be detected in the respective video stream and may further be used to detect the focus of attention of these attendees. The focus of attention may be detected from features extracted from each video stream. The video stream that best reflects the focus of attention may be selected from the multiple video streams. Based on this video stream, the area of maximum interest can be identified and used, for example, for automatic video editing, metadata creation, search, personalization, etc.

In another example, one or more images of a scene are captured of an event such as a birthday party or a product presentation. In this scenario, gazes of the human objects can be used to determine which region in the image(s) is the focus of attention which can then be used to determine the identity of the person or the object of interest using machine learning techniques.

Figure 1:
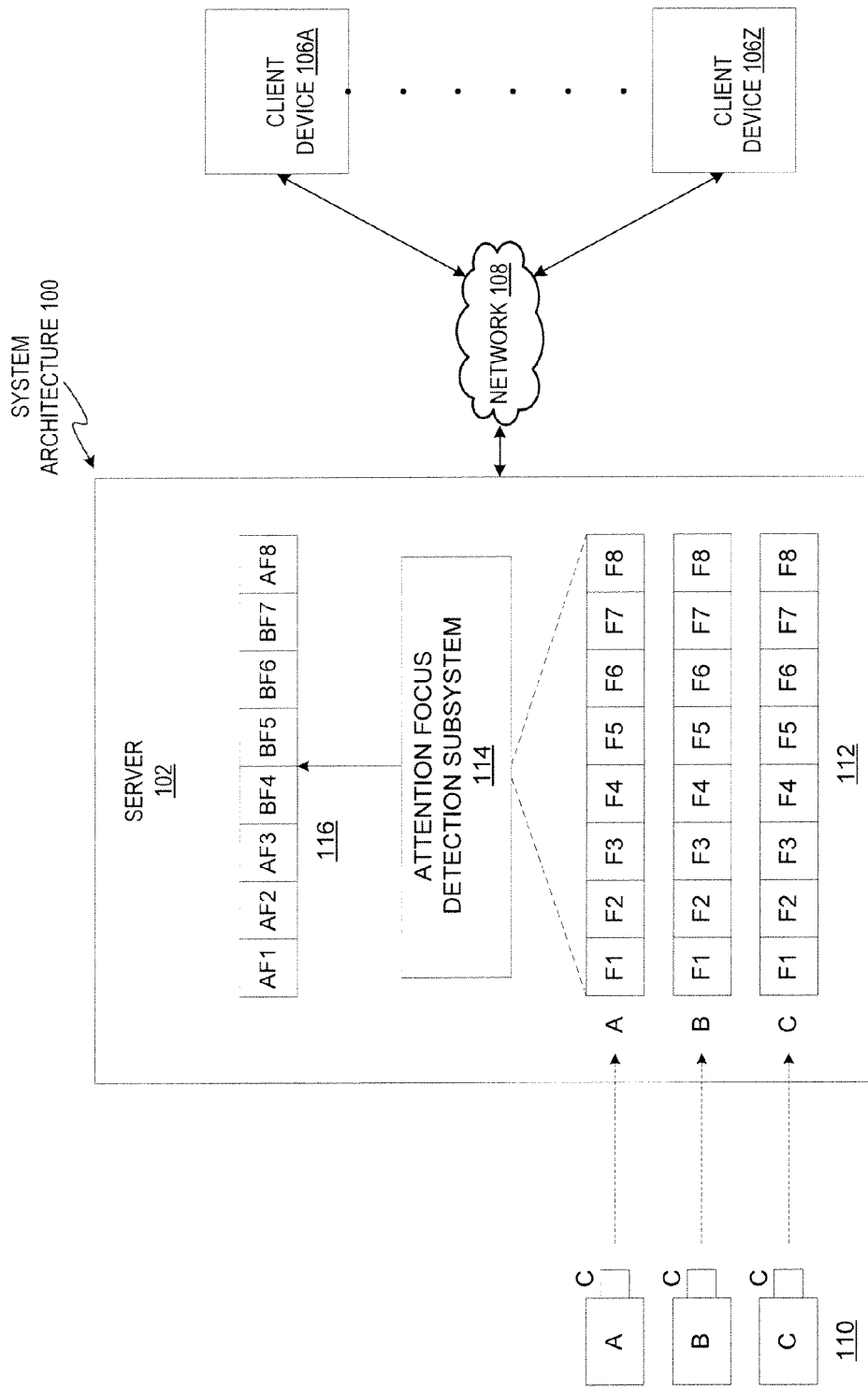
FIG. 1 illustrates a system architecture in which aspects of the present disclosure can be implemented.

FIG. 1 illustrates a system architecture in which aspects of the present disclosure can be implemented. The architecture 100 may include a server 102 which may be connected to client devices 106A through 106Z via a network 108. Network 108 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data.

The client devices 106A through 106Z may each include computing devices such as personal computers (PCs), laptops, mobile phones, smart phones, tablet computers, netbook computers, etc. In some implementations, client device 106A through 106Z may also be referred to as "user devices."

In one example, server 102 may be part of a content sharing platform and users of client devices 106A through 106Z may retrieve and watch contents stored on the content sharing platform. In this example, each client device may include a media viewer (not shown). In one implementation, the media viewers may be applications that allow users to view content, such as images, videos, web pages, documents, etc. For example, the media viewer may be a web browser that can access, retrieve, present, and/or navigate content (e.g., web pages such as Hyper Text Markup Language (HTML) pages, digital media items, etc.) served by a web server. The media viewer may render, display, and/or present the content (e.g., a web page, a media viewer) to a user. The media viewer may also display an embedded media player (e.g., a Flash® player or an HTML5 player) that is embedded in a web page (e.g., a web page that may provide information about a product sold by an online merchant).

In another example, the media viewer may be a stand-alone application (e.g., a mobile app) that allows users to view digital media items (e.g., digital videos, digital images, electronic books, etc.).

In yet another example, the media viewer of client devices 106A through 106Z may include software modules that allow client devices 106A through 106Z to upload user-generated contents to the content sharing platform 102 via network 108. For example, client devices 106A through 106Z may include hardware capabilities (such as microphones and cameras) to record media contents (audio/video clips). Further, the media view of client devices 106A through 106Z may include a software plug-in that allows a user to select and upload media contents to the content sharing platform 102.

The media viewers may be provided to the client devices 106A-106Z by the content sharing platform. For example, the media viewers may be applications that are downloaded from the content sharing platform or a third-party app store.

In general, functions described in one implementation as being performed by the server 102 can also be performed on a different computer system (e.g., client device 106) in other implementations if appropriate. In addition, the functionality attributed to a particular component can be performed by different or multiple components operating together. The server 102 can also be accessed as a service provided to other systems or devices through appropriate application programming interfaces, and thus is not limited to use in websites.

In one implementation, the server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to automatically edit media items provided by users of client devices 106, create metadata for media items provided by users of client devices 106, provide users with access to media items including, for example, allowing a user to consume, upload, search for, approve of ("like"), dislike, and/or comment on media items.

A media item may be consumed via the Internet and/or via a mobile device application. For brevity and simplicity, an online video (also hereinafter referred to as a video) is used as an example of a media item throughout this document. As used herein, "media," media item," "online media item," "digital media," "digital media item," "content," and "content item" can include an electronic file that can be executed or loaded using software, firmware or hardware configured to present the digital media item to an entity. In one implementation, the server 102 may store hyperlinks to the media items stored on the data stores.

According to some aspects, some or all client devices 106 can include cameras that can simultaneously record an event. For example, a client device 106 can be a mobile phone or a tablet that has a built-in camera capable of capturing a video. In addition or alternatively, some client devices can be independent cameras (e.g., camcorders or video camera recorders) that can capture an event and provide resulting video clips to the server 102. For example, video clips can be uploaded to the server 102 directly from a camera (e.g., via a WiFi connection) or by connecting a camera to another user device (e.g., a personal computer or a tablet) and uploading video clips to the server 120 through that other user device.

In one example, cameras such as camcorders 110.A through 110.C may record a conference from different locations to capture different aspects of the conference. The locations and angles of camcorders may be fixed through the proceeding so that some camcorders may capture the speaker (presenter) and the presentation, and other camcorders may capture audience. During the presentation, the roles of the speaker and audience may switch. Thus, the attention focus may change. For this reason, at any given moment, at least one of the camcorders 110.A through 110.C may best capture the attention focus of the conference.

Video clips 112.A through 112.C captured by camcorders 110.A through 110.C may be uploaded to the server 102 as discussed above. Alternatively, video clips 112.A through 112.C may be uploaded to a different system/repository and be retrievable through hyperlinks stored in the server 102. For the convenience of discussion without limiting the scope of this disclosure, it is assumed that video clips 112.A through 112.C are stored on the server 102.

Video clips 112.A through 112.C recorded at an event (such as the conference) may be in the form of raw video clips. Each video clip may include a sequence of video frames (e.g., F1 . . . , Fn, where n is a frame index) and optionally, a sound track. Each video frame may include an N×M array of pixels, where N and M are the spatial resolution of the video clips. In one implementation, the resolution of the video clips may match the resolution of camcorders 110.A through 110.C. Alternatively, the resolutions of video clips may be different from that of camcorders. In one implementation, since these video clips are recorded simultaneously at the event, these video clips are temporally aligned. Therefore, the frames that have the same index numbers in different video clips are recorded at the same time instant.

Server 102 may include an attention focus detection subsystem 114 to detect attention focus using video clips 112.A through 112.C. In one implementation, subsystem 114 may be a software application executed on a processing device (such as a processor) of server 102. Alternatively, subsystem 114 may be a hardware component or a combination of hardware and software that may detect attention focus for an event at any time instance. The output of subsystem 114 may be an edited video that is generated by composing video frames selected from video clips 112.A through 112.C based on the detected attention focus. For example, subsystem 114 may detect that the attention focus is best captured in video clip 112.A for frame F1 through F3, best captured in video clip 112.B for frames F4 through F7, and again best captured in video clip 112.C for frame F8. The resulting video clip 116 may include frames from video clip 112.A (AF1-AF3), frames from video clip 112.B (BF4-BF7), and a frame from video clip 112.C (CF8). The resulting video clip 116 may be made accessible to client devices 106.A through 106.Z so that users of these devices may view the edited video clip 116. Additionally, subsystem 114 may further detect the region that has the most salient area of interest in each video frame (AF1-AF3, BF4-BF7, and CF8). These regions may be cropped out (or labeled) and presented in video clip 116. In this way, the user experience of the content sharing platform 102 may be improved.

The detected attention focus and regions of salient interests may be used to automatically edit video clips and create metadata for video clips that facilitate search and personalization of video clips stored on content sharing platform 102.

Implementations of the disclosure may be further illustrated in the following video conference example. Although video conference is used as an example to illustrate implementations of the disclosure, the disclosure is not limited to video conference and may also be applied to other types of recorded events such as concerts or sport events. In addition, although some implementations of the disclosure are discussed in connection to camcorders, any other cameras capable of capturing a video can be used to provide the functionality discussed herein.

In situations in which the systems discussed herein collect personal information about users, or may make use of personal information, the users may be provided with an opportunity to control whether the content server collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 102.

Figure 2A:
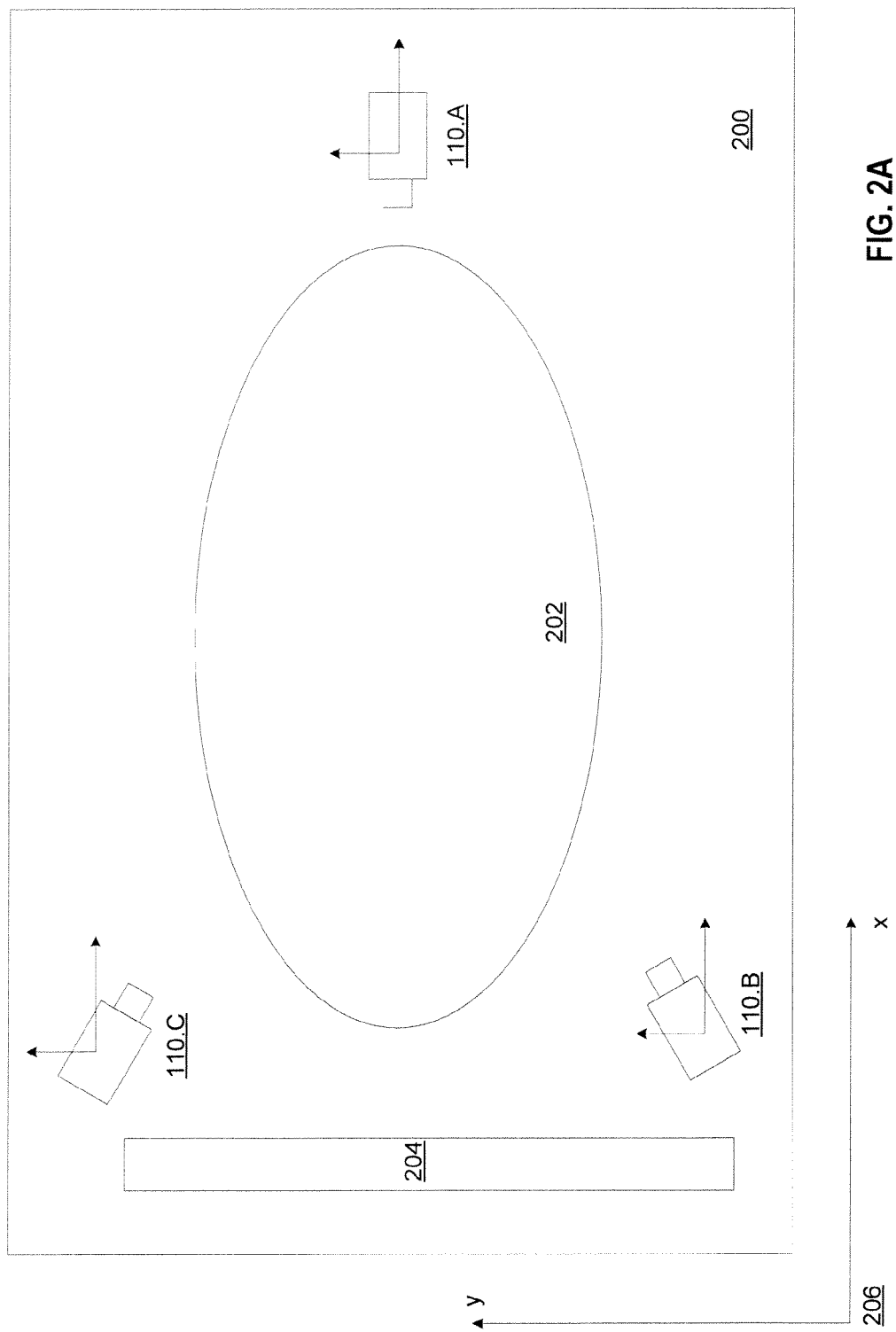
FIGS. 2A-2D illustrate the calculation of attention focus according to implementations of the disclosure.

FIG. 2A illustrates a setting 200 for a recorded video conference according to an implementation. The setting 200 may be a conference room. Inside the conference room 200, there may be certain furniture such as a conference table 202 and a screen 204 to display presentations. Video cameras such as camcorders 110.A through 110.C are placed at different locations in the conference room to capture views from different angles. In one implementation, camcorders 110.A through 110.C are placed so that what happens in the conference room is captured by at least one of the camcorders.

In one implementation, setting 200 is oriented in a coordinate system 206 referred to as a world coordinate system. In one implementation, the world coordinate system is a 2D coordinate system including x and y axes covering the ground floor of the conference room. In another implementation, the coordinate system is 3D coordinate system (not shown) including x, y, and z axes covering the floor and height of the conference room. Each object in the conference room may be referenced with respect to coordinate system.

In one implementation, locations of camcorders 110.A through 110.C with respect to the coordinate system 206 may be determined in advance. For example, the origin of coordinate system 206 may be at a corner of the conference room. The locations of each camcorder may be measured manually or automatically using various location detection mechanisms.

In one implementation, the orientation of each of the cameras may also be determined in advance. The orientation of a camera is the direction of the optical axis of the camera with respect to coordinate system 206. The orientations of cameras may be determined using various camera calibration methods. Once the locations and orientations of camcorders are determined, a 2D (or 3D) scene may be reconstructed in the sense that a pixel in any video frame may be mapped to a 2D (or 3D) coordinate in coordinate system 206 using stereo methods. In another implementation, the locations of objects may be recovered using known object dimensions (e.g. the size of body parts such as face size or eye-distance in the case of human objects) and their observed pixel size in the media clips. In yet another implementation, their locations may be determined based on additional depth sensors. Thus, locations of objects (such as human objects) within the scene may be determined by video frames of the calibrated camcorders 110.A through 110.C.

Figure 2B:
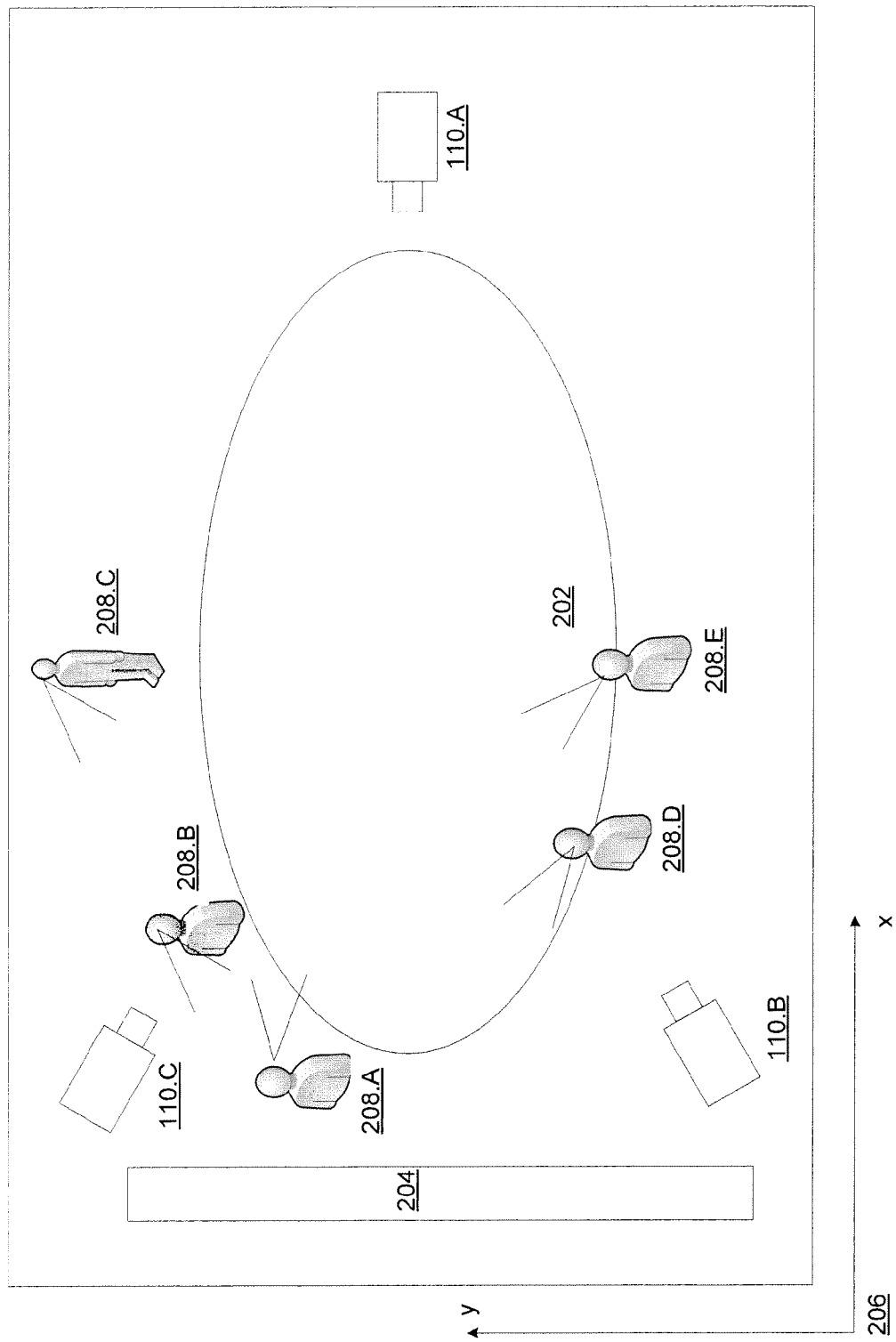

FIG. 2B illustrates human objects in setting 200 according one implementation of the disclosure. The camcorders 110.A through 110.C are arranged in the same manner as FIG. 2A. As shown in FIG. 2B, setting 200 may also include human objects 208.A through 208.E that may be captured by at least one of camcorders 110.A through 110.C. Subsystem 114 as shown in FIG. 1 may further include a face detection module that may detect and track faces in video frames. The detected faces may indicate the locations of human objects. Although the discussion has been in view of multiple camcorders, it is possible to obtain a rough reconstruction of the scene using a single view (or a single camera). For example, by assuming certain fixed body features (such as the distance between two eyes or the head size), the distance of a human object to a calibrated camera may be determined from their relative size in the video frame of the camera. Therefore, the locations of human objects may be determined using either one or more than one cameras.

Implementations may further calculate an attention map representing a combined attention of the human objects in the scene. The attention map may be mapped to the reconstructed 2D (or 3D) scene with respect to coordinate system 206. In one implementation, the attention map may be calculated on a 2D grid that overlays on the ground floor, the 2D grid including cells that each includes an attention value. The attention value of each cell may indicate a measurement of the combined attention from human objects in the scene. For example, the cells may be one foot by one foot cells on the ground floor.

In another implementation, the attention map may be calculated on a 3D grid that fills the space of the 3D scene. Similarly, the 3D grid includes cells that each including an attention value indicating a measurement of the combined attention from human objects in the scene. For example, the cells may be cubes having sides of one foot length.

Figure 2C:
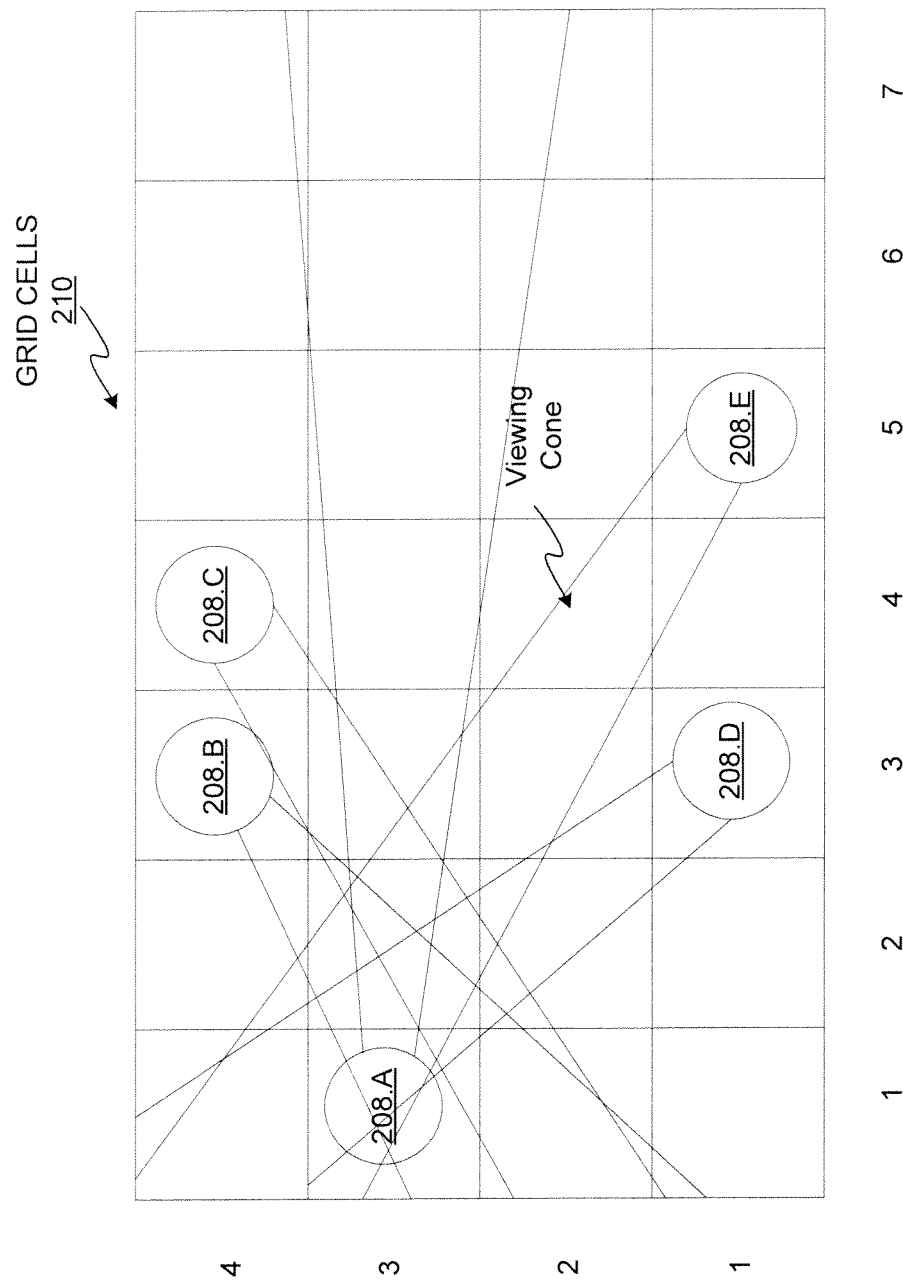

In one implementation, the attention map may be calculated from locations and gaze directions of human objects (such as 208.A through 208.E). FIG. 2C illustrates the calculation of attention map according to an implementation of the disclosure. Referring to FIG. 2C, the ground floor may be partitioned into grid cells 210 on which a combined attention value may be calculated and assigned. As discussed above, a face detection module may first detect human faces in video frames at a time instance (or those video frames with same index number among video clips such as 112.A through 112.C). The locations of human objects 208.A through 208.E may be determined based on the detected faces in video frames from different cameras (such as camcorders 110.A through 110.C) based on a rough estimate from a single view or stereo estimate from multiple views. Further, gaze directions of human objects may be calculated from detected faces in the views of cameras. The calculated gaze directions may indicate where the human objects look at, or the attention directions of human objects. In one implementation, as shown in FIG. 2C, a viewing cone may be calculated based on the gaze direction and a determined field of view for each human object. A viewing cone includes multitude of directions, from a viewer's perspective, from which an intended object can be seen without distortions, in which each direction may have an individual weight of attention. The central axis of the cone is the straight line, passing through the apex, about which the base has a rotational symmetry. In one implementation, the determined field of view for human objects is a fixed angle. For example, the field of view may be assumed to be 60° for each human object. The viewing cone may extend from the human object to boundaries of the scene.

A map of combined attention may be calculated based on the viewing cones of human objects. In one implementation, each cell of grid cells 210 may receive an attention score from a human object if the human object's viewing cone covers the cell. In one implementation, the score from the human object is a constant positive value if the viewing cone overlaps with the cell and zero if the viewing cone does not overlap with the cell. The combined attention value for a cell is a total votes from all human objects whose viewing cones overlap with the cell.

In another implementation, the score from the human object may be calculated as a function of a distance from the human object and/or a distance measure of the cell from a central axis of the viewing cone. For example, the score may be inversely proportional to the distance from the human object—or the farther way, the lower the score, and inversely proportional to the distance measure from the central axis of the viewing cone. In another example, the score may be modeled after a Gaussian Bell curve with respect to the distance to the central axis and with exponentially decreasing value along the direction from the apex of center axis. Thus, the combined attention value for a cell is an accumulated score from all human objects as a function of their respective distance from the cell and angle of overlapping viewing cone.

In yet another implementation, the score from the human object may also take into consideration its historical values. Since the score is calculated from video frames at a time instant, it has therefore a history of score values that vary over time. Historical values may be used to place weights on the score to achieve temporal smoothing and consistent attention map. In one implementation, the historical values may contribute an exponentially decaying weight to the score, where the exponent may be adjustable to achieve different levels of smoothing.

Figure 2D:
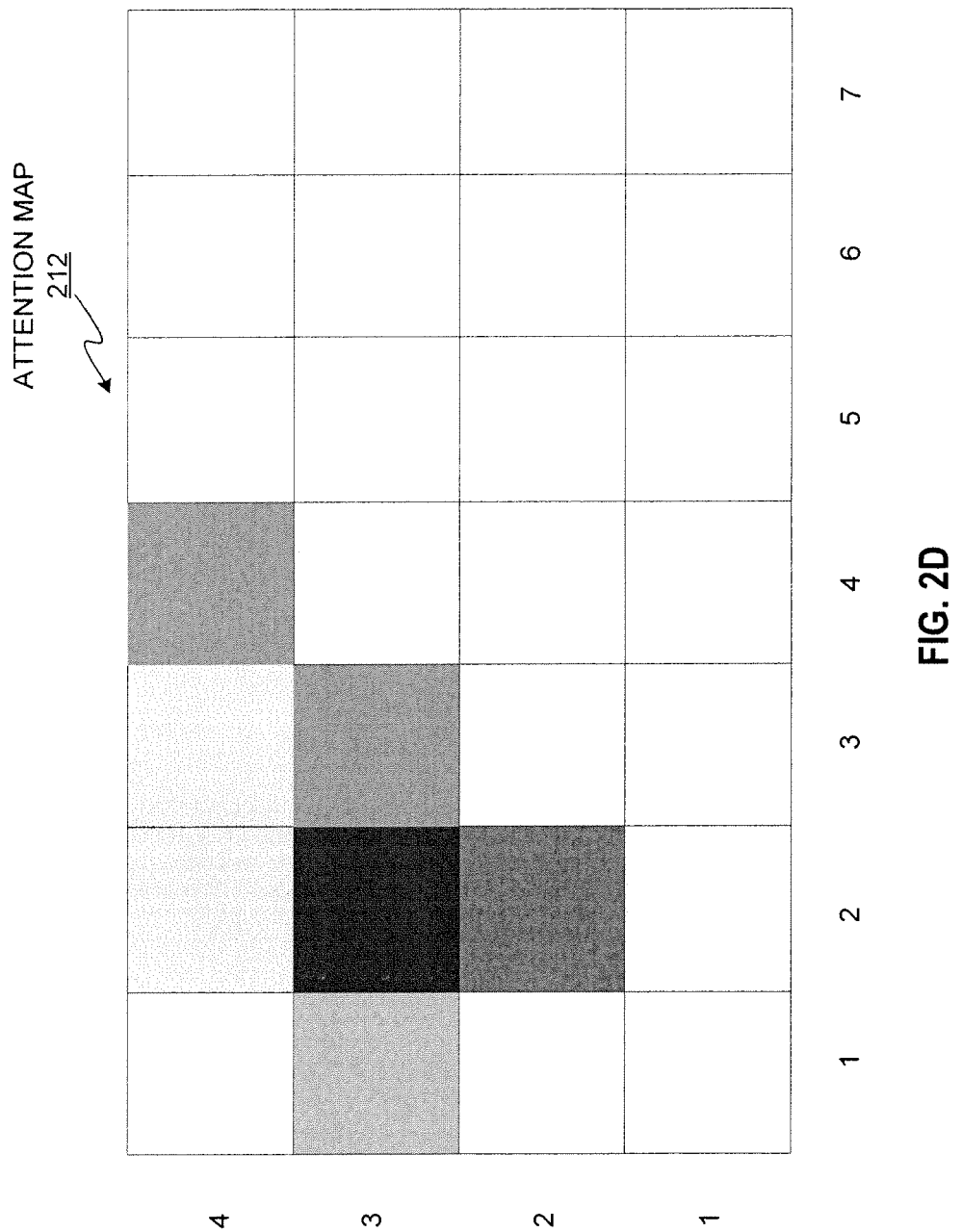

FIG. 2D illustrates an example attention map 212 according to an implementation of the disclosure. The intensity values, corresponding to the combined attention value, of each cell of the attention map 212 may be calculated using systems and methods as discussed above. As shown in FIG. 2D, combined attention values are calculated for each cells in the cell grid 210 and based on the one cell (2, 2) may be determined at the attention focus among human objects in the scene.

Although implementations as shown in FIGS. 2A-2D are illustrated using 2D scene examples, the implementations may be equally applied to 3D scene in similar manners. Further, implementations of the disclosure are not limited to grid cells. The attention map may be calculated using non-grid methods. For example, in one implementation, particle filters or Gaussian mixtures may be used to trace viewing cones from human objects and calculate the combined attention value for any locations in the 2D (or 3D) scenes. The resulting attention map then may be in the form of continuous intensity map.

The calculated attention map may be used for video editing and other purposes. In one implementation, subsystem 114 as shown in FIG. 1 may determine a video frame out of all video frames for that time instant as the one that best captures the attention focus and select that video frame to be part of the edited video clip. The selected video frames may be combined to form an "interest edited" video clip 116. In another embodiment, subsystem 114 may further crop (or label) a region of the attention focus out of the whole video frame and display the cropped out region of attention focus. This region may focus on the current object of interest. For example, in one embodiment, the region may focus on the face of a human object toward which other human objects are looking at (or pay attention to).

In one implementation, face recognition may be performed on the focused-on human object and generate metadata that includes the identity of the recognized human object.

FIG. 3 illustrates flow diagrams of methods to detect focus of attention from videos according to some implementations of the disclosure. The method may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, the methods may be performed by the attention detection subsystem 114 as shown in FIG. 1.

Referring to FIG. 1, at 302, subsystem 114 of a content sharing platform 102 may identify at least one video clip associated with an event. The video clip(s) may have been captured by at least one camera at an event (such as a conference), and uploaded and stored either on the sever 102 or in a data store accessible to subsystem 114. In case of multiple video clips, they may be captured at a scene from different locations and different angles. Further, the camera(s) may be calibrated at locations and angles in a world coordinate system.

At 304, subsystem 114 may detect human objects in the video clip(s). In one implementation, subsystem 114 may include a face detection component for detecting human faces in video frames of the video clip(s). The detected human faces may represent human objects in the scene. Further, subsystem 114 may determine locations and gaze directions of these human objects. Based on the locations and gaze directions, viewing cones for human objects may be formed as discussed above. The viewing cones may cover the area of attention from human objects.

At 306, subsystem 114 may calculate a focus of combined attentions from the detected human objects. In one implementation, the scene may be partitioned into cells each of which may be assigned an accumulated score calculated based on the viewing cones from different human objects.

At 308, subsystem 114 may generate an edited video using the focus of combined attention from the human objects. In one implementation, the edited video may be the one, selected from video frames of the video clip(s), that best represents the focus of combined attentions form human objects. In another implementation, regions that surround the focus of combined attentions may be cropped (or labeled) from the edited video for presentation to viewers of the edited video.

Figure 4:
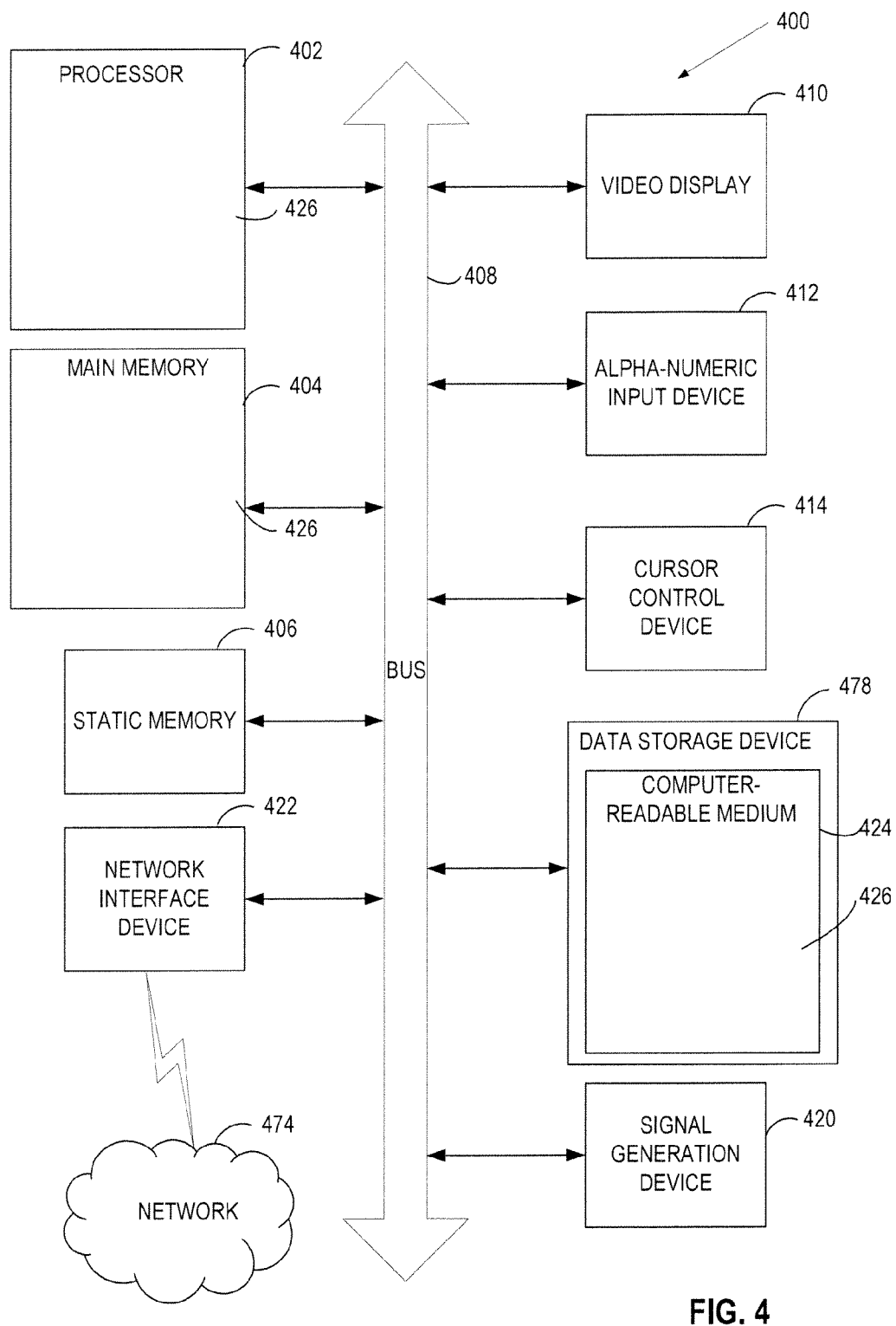
FIG. 4 is a block diagram illustrating an exemplary computer system, according to some implementations of the disclosure.

FIG. 4 illustrates a diagrammatic representation of a machine in the exemplary form of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD), a cathode ray tube (CRT), or a touch screen), an alphanumeric input device 412 (e.g., a keyboard), a cursor control device 414 (e.g., a mouse), and a signal generation device 420 (e.g., a speaker).

The data storage device 418 may include a computer-readable storage medium 424 on which is stored one or more sets of instructions 426 (e.g., software) embodying any one or more of the methodologies or functions described herein (e.g., instructions of the annotation subsystem 112). The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 474 via the network interface device 422.

While the computer-readable storage medium 424 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
    identifying, by a processing device, at least one media clip representing a scene including a plurality of human objects;
    determining a respective location and a respective gaze direction associated with each of the plurality of human objects;
    partitioning the scene into a plurality of cells;
    calculating a respective viewing cone associated with each of the plurality of human objects based on the respective location and the respective gaze direction, wherein the respective viewing cone overlaps one or more of the plurality of cells;
    for each cell, determining an accumulated attention value based on viewing cones that overlap a respective cell; and
    calculating, by the processing device, a region in the at least one media clip containing a focus of attention of the plurality of human objects based on accumulated attention values associated with the plurality of cells.

2. The method of claim 1, further comprising:
    detecting the plurality of human objects in the at least one media clip, wherein detecting the plurality of human objects comprises:
    detecting a plurality of faces in the at least one media clip;
    determining a location of each of the plurality of human objects based on a respective detected face; and
    determining a gaze direction of each of the plurality of human objects based on the respective detected face.

3. The method of claim 1, wherein an attention value for a respective human object of the plurality of human objects is calculated as a function of a distance from a corresponding cell to the respective human object.

4. The method of claim 1, wherein an attention value for a respective human object of the plurality of human objects is calculated as a function of a distance from a central axis of a viewing cone of the respective human object to a corresponding cell.

5. The method of claim 1, wherein an attention value from for a respective human object of the plurality of human objects is determined based on whether a viewing cone of the respective human object overlaps with a corresponding cell.

6. The method of claim 1, wherein the scene is partitioned into one of 2D cells and 3D cells.

7. The method of claim 1, further comprising:
    generating an edited media clip of the at least one media clip using the region containing the focus of attention, wherein the at least one media clip comprises multiple video clips, wherein generating the edited media clip comprises selecting, from the multiple video clips, video frames which best display the region containing the focus of attention.

8. The method of claim 1, further comprising:
    generating an edited media clip of the at least one media clip using the region containing the focus of attention, wherein the at least one media clip comprises an image, and wherein generating the edited media clip comprises selecting a region within the image which best displays the region containing the focus of attention.

9. A non-transitory machine-readable storage medium storing instructions which, when executed, cause a processing device to perform operations comprising:
    identifying, by the processing device, at least one media clip representing a scene including a plurality of human objects;

determining a respective location and a respective gaze direction associated with each of the plurality of human objects;

partitioning the scene into a plurality of cells;

calculating a respective viewing cone associated with each of the plurality of human objects based on the respective location and the respective gaze direction, wherein the respective viewing cone overlaps one or more of the plurality of cells;

for each cell, determining an accumulated attention value based on viewing cones that overlap a respective cell; and calculating a region in the at least one media clip containing a focus of attention of the plurality of human objects based on accumulated attention values associated with the plurality of cells.

10. The machine-readable storage medium of claim 9, wherein the operations further comprise:

detecting the plurality of human objects in the at least one media clip, wherein detecting the plurality of human objects comprises:

detecting a plurality of faces in the at least one media clip;

determining a location of each of the plurality of human objects based on a respective detected face;

determining a gaze direction of each of plurality of human objects based on the respective detected face.

11. The machined-readable storage medium of claim 9, wherein an attention value for a respective human object of the plurality of human objects is calculated as a function of a distance from a corresponding cell to the respective human object.

12. The machine-readable storage medium of claim 9, wherein an attention value for a respective human object of the plurality of human objects is calculated as a function of a distance from a central axis of a viewing cone of the respective human object to a corresponding cell.

13. The machine-readable storage medium of claim 9, wherein the operations further comprises:

generating an edited media clip of the at least one media clip using the region containing the focus of attention, wherein the at least one media clip comprises multiple video clips, wherein generating the edited media clip comprises selecting, from the multiple video clips, video frames which best display the region containing the focus of attention.

14. A system comprising:

a memory; and a processing device, communicably coupled to the memory, to:

identify at least one media clip representing a scene including a plurality of human objects;

determine a respective location and a respective gaze direction associated with each of the plurality of human objects;

partition the scene into a plurality of cells;

calculate a respective viewing cone associated with each of the plurality of human objects based on the respective location and the respective gaze direction, wherein the respective viewing cone overlaps one or more of the plurality of cells;

for each cell, determine an accumulated attention value based on viewing cones that overlap a respective cell; and calculate a region in the at least one media clip containing a focus of attention of the plurality of human objects based on accumulated attention values associated with the plurality of cells.

15. The system of claim 14, wherein the processing device is further to detect the plurality of human objects in the at least one media clip, and wherein to detect the plurality of human objects, the processing device is further to:

detect a plurality of faces in the at least one media clip;

determine a location of each of the plurality of human objects based on a respective detected face; and determine a gaze direction of each of the plurality of human objects based on the respective detected face.

16. The system of claim 14, wherein an attention value for a respective human object of the plurality of human objects is calculated as a function of a distance from a corresponding cell to the respective human object.

17. The system of claim 14, wherein an attention value for a respective human object of the plurality of human objects is calculated as a function of a distance from a central axis of a viewing cone of the respective human object to a corresponding cell.

* * * * *